Jan. 18, 1966      L. G. HORWITT      3,230,345
ELECTRIC CIGAR LIGHTER
Filed Aug. 23, 1963
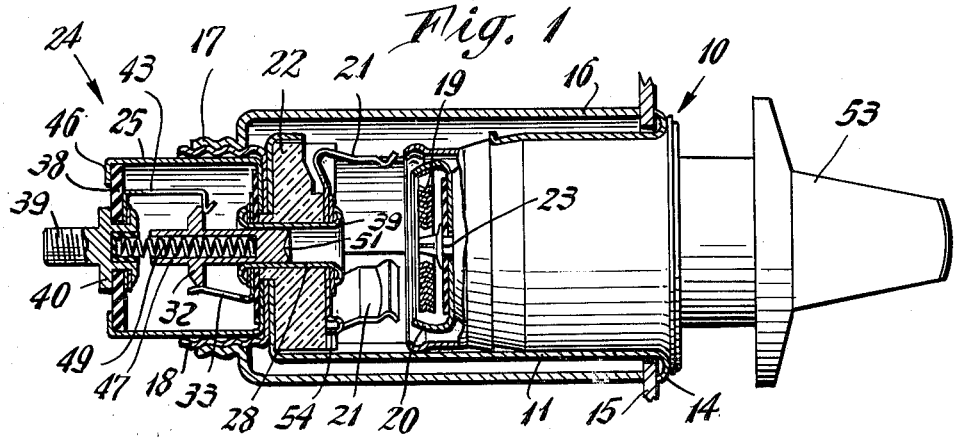
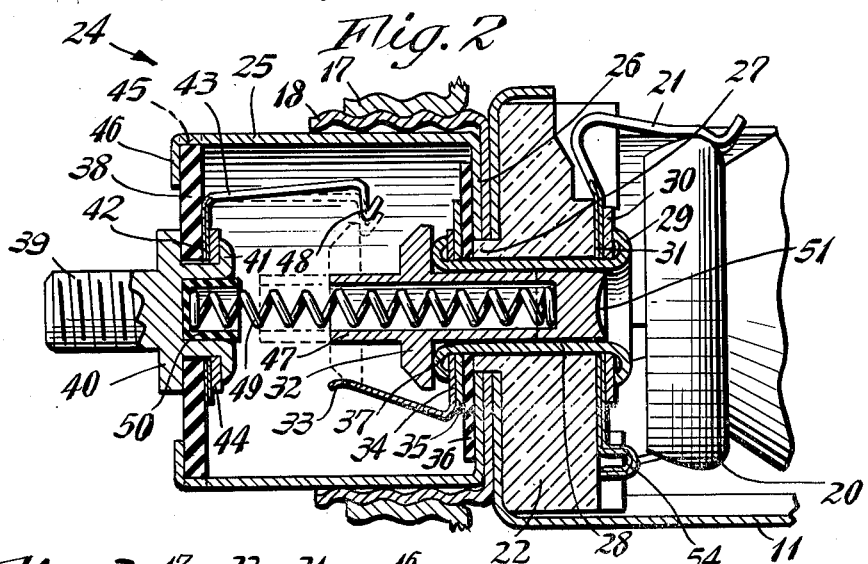
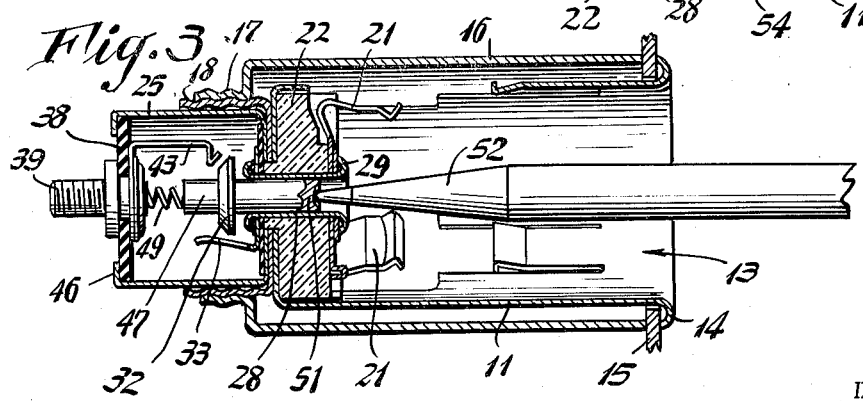
INVENTOR.
*Laurence G. Horwitt*
BY
*Johnsmand Kline*
ATTORNEYS United States Patent Office 3,230,345
Patented Jan. 18, 1966

3,230,345
ELECTRIC CIGAR LIGHTER
Laurence G. Horwitt, New Haven, Conn., assignor to Casco Products Corporation, a corporation of Connecticut
Filed Aug. 23, 1963, Ser. No. 304,087
6 Claims. (Cl. 219—265)

This invention relates to electrical cigar lighters of the removable ignition type and more particularly to such cigar lighters having improved resettable circuit breaking means.

Heretofore it has been proposed to provide cigar lighters of the type referred to with safety devices such as fuses and circuit breakers which cause the circuit leading to the igniting unit from a battery or other source of supply to be opened if the device becomes heated to a dangerous degree by some malfunctioning of the lighter, a short circuit or the like.

Such safety devices such as fuses have been mounted on the cigar lighter for removal and replacement after the fault has been corrected, but this involves considerable annoyance and some cost. Other safety devices have been of the heat-responsive automatically resettable type which repeatedly open, reclose and open the circuit until the fault is removed after which they then reclose the circuit. The continued reclosing and opening of the circuit if it continues unnoticed for any considerable time places a severe drain on the battery of the motor vehicle and can result in the complete discharge of the battery.

Another type of safety device provides for opening the circuit in case of a fault and keeping it open until reset manually. However, as heretofore proposed, such devices could only be reset when attached to a cigar lighter mounted on the instrument panel by reaching up around the lower edge of the instrument panel to gain access to the back end of the lighter, if in fact the safety device could be reached in that way. Otherwise, the lighter would have to be removed from the instrument panel, as it would in the case of the lighters mounted elsewhere in the vehicle.

Another disadvantage of the safety devices of cigar lighters as heretofore provided is that when the circuit was opened there was nothing to indicate that fact except that the igniter would not be heated for use, and whether or not a fault existed or whether the heating element was burned out could not be determined until the heating element was examined and tested.

An object of this invention is, therefore, to provide a cigar lighter with a manually resettable circuit breaker having means which is accessible to be operated to reset the circuit breaker through the open end of the holder for the removable igniting unit when the latter is removed from the holder, thus avoiding the difficulties of reaching the reset means to reset the device.

Another object is to provide a cigar lighter with means for indicating that the circuit breaker has opened the circuit so that the fault which caused its operation can be investigated and corrected. Preferably such indicating means may be observable through the open end of the holder when the igniter is removed.

Other features and advantages will hereinafter appear.

In the accompanying drawings:

FIGURE 1 is a longitudinal cross section of a cigar lighter embodying the present invention with part of the igniter shown in elevation, the circuit breaker being shown in closed circuit position.

FIG. 2 is an enlarged fragmentary sectional view of the inner end of the cigar lighter showing the circuit breaker in open circuit position.

FIG. 3 is a sectional view of the holder with the igniter removed showing the circuit breaker in the act of being reset by an instrument such as a tapered wooden stick extending into the open end of the holder.

In the accompanying drawings the cigar lighter shown is of the type having an igniting unit 10 which is removably mounted on a holder 11 which is in the form of a hollow tube having an open end 13 provided with a flange 14. The holder 11 is usually inserted in a hole in the instrument panel 15 where it is held by a clamping sleeve 16 having a threaded neck 17 engaging a threaded collar 18 on the inner end of the holder by which the outer end of the sleeve is forced against the inner surface of the panel 15 and the flange 14 of the holder is forced against the outer surface of the panel.

The igniting unit has a heating element 19 comprising a spiral coil of resistance wire mounted in a contact cup 20 to which one end of the wire is connected.

When the igniting unit is to be energized the contact cup 20 is caused to engage bimetallic contact fingers 21 carried by an insulating block 22 in the bottom of the holder. Usually the contact fingers 21 are secured to the block 22 by a terminal which is connectible to the live leg of the battery or other source of current. The other leg of the battery being grounded, the circuit to the heating element wire is completed through the chassis of the vehicle, the panel 15, holder 11, igniter 10 to the post 23 of the heating element through the latter to the cup 20 and contact fingers 21 back to the battery.

According to the present invention the contact fingers 21 are connected to the live leg of the battery by a circuit breaker indicated generally by the reference number 24. It comprises a housing 25 having a centrally apertured flat bottom 26 mounted on a boss 27 on the insulating block 22 on which the centrally apertured portions of the holder 11 and collar 18 are also mounted. The housing 25 is secured in position projecting from the closed end of the holder 11 by an eyelet 28 which extends through the insulating block and has its spun-over end 29 engaging a washer 30 which in turn secures the base 31 of the contact fingers 21 to the block 22.

Within the housing 25 there is a contact arm 33 having a base 34 which is mounted on the eyelet 28. Between the base 34 and the bottom 26 of the housing there are interposed a metal washer 35 and an insulating washer 36 so that when the inner end 37 of the eyelet is spun over the assembled parts, comprising the base 34, the contact 33, the washer 35, the insulating washer 36, the housing 25, the sleeve 18, the holder 11, the insulating block 22, the base for the contact fingers 21 and the washer 30, will all be secured together in coaxial alignment, and the contact arm 33 will be electrically connected to the contact fingers 21 and insulated from the holder 11, the sleeve 18 and the housing 25.

The other end of the housing 25 is closed by a disk 38 of insulating material which has a central aperture in which is mounted a threaded stud 39, a flange 40 of which engages the outer face of the disk while the spun-over neck 41 secures the base 42 of a bimetallic contact arm 43 and a washer 44 against the inner face of the disk 38. The disk 38 abuts the end of the housing 25 and is held in fixed position thereon by bent-over ears 46 which pass through peripheral notches 45 in the disk to be held thereby against rotation relative to the housing. The threaded stud 39 constitutes a terminal to which a lead wire from a battery or other source of current may be connected, and when this is done the bimetallic contact arm 43 becomes energized.

To close the gap between the current-carrying arm 43 and the contact arm 33 which is connected to the contacts 21, the present invention provides a conducting disk 32 mounted on or integral with a plunger 47 which is slidably mounted in the eyelet 28 and which in its normal closed circuit position shown in FIG. 1 simultaneously engages the contact arms 33 and 43.

The contact arm 43 is provided with a hook portion 48 which engages over the peripheral edge of the disk 32 and holds the disk in its circuit closing position.

If, in the operation of the cigar lighter, due to some fault, for instance, a short circuit or improper operation, excessive heat is produced by the heating element 19, the heat is transferred through the eyelet 28, the plunger 47 and the disk 32 to the contact arm 43. The arm 43 being made of bimetal, when it becomes heated it moves radially outwardly so that the hook portion 48 will move away from the edge of the disk 32. When this happens, due to the operation of a spring 49, the plunger moves from the dotted line position shown in FIG. 2 to the full line position shown therein, thus breaking the circuit between the contact arms 33 and 43. The spring 49 is partly housed in the plunger 47 while its other end is held in an insulating cup 50 nested in the stud 39. Thus, the circuit to the heating element is broken and will remain broken until the plunger 47 is operated to move the disk 32 to the position shown in FIG. 1. The same operations occur if, as shown in FIG. 1, a short circuit causes the current in the contact arm 43 to overheat it.

As pointed out above, the present invention provides a cigar lighter having a manually resettable circuit breaker which can be reset from the open end of the holder 11. To accomplish this, the plunger 47 is made of such length that its end 51 may be engaged for operation by means of an implement such as the pointed stick of wood 52 shown in FIG. 3 which may enter the eyelet 28 and be applied to the plunger so as to force the plunger inwardly of the housing 25 to permit the hooked end 48 of the spring contact arm 43 to engage and retain the disk 32 in closed circuit position. This resetting operation is performed, of course, after the igniter is removed from the holder and after the holder, and particularly the bimetallic spring contact 43, has had an opportunity to cool off. Should the plunger be operated before this or while the fault or short circuit still exists, it will immediately return to the position shown in FIG. 2.

In order to indicate that the circuit has been broken, the plunger 47 is of such length that when it is in its open circuit position it can be seen prominently near the end of the eyelet by looking into the holder 11, while in its normal circuit closing position it can be observed as deep in the eyelet.

It should be noted that since the plunger 47 is in contact with the eyelet and the eyelet is in contact with the bimetallic contact fingers 21, in the broader aspects of this invention the contact 33 could be omitted. However, to insure satisfactory contacts under pressure, it is preferable to close the circuit between the contact spring 43 and the contact spring 33 which has firm electrical engagement with the eyelet.

In the cigar lighter illustrated, when the heating element 19 is to be energized the knob 53 is pressed inwardly causing the contact cup 20 to engage the bimetallic contact fingers 21 and is held in that position until the heating element 19 becomes sufficiently hot for use, whereupon the bimetallic fingers 21 yield and permit the igniting unit with the cup 20 to return to open circuit position by spring means contained within the igniting unit in a manner well known in the art. It is the operation of the bimetallic fingers 21 which controls the normal closing and opening of the circuit to the heating element. If the heating element is released properly by the bimetallic fingers, as soon as it becomes sufficiently hot for use insufficient heat will be transmitted to the bimetallic latch finger 43 and the circuit breaker will remain in closed circuit position. However, if the contacts 21 fail to release the contact cup 20 or if the igniting unit is held in by hand or otherwise, excessive heat will be transmitted through the metallic parts to the latch finger 43 causing it to deform and allowing the conducting disk 32 to disengage the contact 43.

The same operations will occur if the latch finger 43 becomes overheated by the current passing through it which would occur when a short circuit exists between the current carrying contacts 21 and the grounded holder 11.

The heating element 19 is prevented from engaging the inner end 29 of the eyelet 28 by stop lugs 54 formed integral with the contact fingers 21 and which will engage the edge of the cup 20 of the latter before the heating element can contact the spun-over end 29 of the eyelet.

Variations and modifications may be made within the scope of the claims and portions of the improvements may be used without others.

I claim:

1. In an electric cigar lighter having an elongate holder having a cavity for supporting an igniting unit for removal and replacement therein through an open end of the holder and a bottom wall for closing the other end of the holder; electric contact means including means mounted on the bottom wall of the holder adapted to engage the inner end of the igniting unit for completing an electric circuit to the igniting unit when the latter is to be energized, the improvement comprising a normally closed heat-responsive circuit breaker in said electric circuit between a source of current supply and said contact means on the holder and having means normally maintaining said circuit closed but responsive to heat in excess of normal operating heat to open the circuit to said contact means, said circuit breaker comprising a housing mounted on and projecting from the exterior of said bottom wall of the holder, an input terminal mounted on said housing, and means accessible through the open end of the holder when the igniting unit is removed from the holder for manually resetting the circuit breaker.

2. A cigar lighter according to claim 1 in which the circuit breaker also has means observable by the user when the igniting unit is removed from the holder to indicate that the circuit breaker has operated to open the circuit.

3. A cigar lighter according to claim 1 in which the circuit breaker includes a pair of spaced resilient metal fingers, one of which is electrically connected to said input terminal and the other of which is electrically connected to said contact means, and an axially movable conductor adapted to engage and electrically connect and disengage and electrically disconnect said resilient fingers to close and open a circuit between the input terminal and said contact means, one of said resilient fingers having a latch portion to engage and hold said movable conductor in circuit-closing position, said latch-carrying finger being bimetallic and biased to release said axially movable conductor when excessively heated, and spring means for moving the axially movable conductor to position to open the circuit between said resilient fingers when released by said latch-carrying finger.

4. A cigar lighter according to claim 3 in which the means for resetting the circuit breaker includes means connected to the axially movable means and extending through the bottom wall of the holder in the direction of the open end of the latter.

5. A holder for the igniting unit of a cigar lighter having a cavity for removably supporting an igniting unit, the bottom of the cavity being constituted by a wall; insulating means engaging said wall and having projecting contacts thereon for engagement with the igniting unit; a housing mounted on said wall at the exterior side thereof and an eyelet passing through said insulating block and engaging said contact means and securing the housing to the holder; a first resilient contact finger secured to said wall by said eyelet and projecting therefrom into the housing; an end block of insulating material closing the rear end of said housing; an input terminal secured to said end block; a second resilient contact finger in said housing in electrical engagement with said input terminal and having a latch portion on its free end; a plunger slidably mounted in said eyelet for axial movement; conductor means carried by said plunger for simultaneous engagement with said first and second resilient contact fingers for closing the circuit between the same; and resilient means normally urging said conductor to a position in which said fingers are disengaged, said latch-carrying finger being bimetallic and biased to release said conductor when excessively heated, the end of said axially movable plunger being accessible through the cavity of the holder and the eyelet for engagement with a hand-held means to move the plunger and the conductor to position to reengage the resilient finger and be held in closed circuit position by the latch on said bimetallic finger.

6. A holder for an igniting unit of a cigar lighter according to claim 5 in which the accessible end of the plunger is visible through the holder cavity and the eyelet and is of such length relative to the length of the eyelet that its proximity to the end of the eyelet indicates that the conductor is in open circuit position.

References Cited by the Examiner
UNITED STATES PATENTS

| | | | |
|---|---|---|---|
| 2,084,966 | 6/1937 | Ashton | 219—266 X |
| 2,248,407 | 7/1941 | Johnson | 219—263 |
| 2,262,483 | 11/1941 | Ashton | 219—264 |
| 2,704,318 | 3/1955 | Jorgensen et al. | 219—264 |

RICHARD M. WOOD, *Primary Examiner.*